US012555053B2

(12) United States Patent
Crabbe et al.

(10) Patent No.: US 12,555,053 B2
(45) Date of Patent: Feb. 17, 2026

(54) VIRTUAL, REAL-TIME, AND DYNAMIC AVAILABILITY MONITORING TO ENABLE MULTI-CHANNEL POINT-TO-POINT COMMUNICATION

(71) Applicant: Bank of America Corporation, Charlotte, NC (US)

(72) Inventors: Elvin Crabbe, Waxhaw, NC (US); Teron Douglas, Marietta, GA (US); Brian Prezgay, Charlotte, NC (US); Brian P. Gray, Matthews, NC (US); Tushar Jain, West Hills, CA (US); Stephen T. Shannon, Charlotte, NC (US); Lee Aaron Jenkins, Fort Mill, SC (US); Kalyani Deshpande, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 253 days.

(21) Appl. No.: 18/217,707

(22) Filed: Jul. 3, 2023

(65) Prior Publication Data
US 2024/0232750 A1    Jul. 11, 2024

Related U.S. Application Data

(60) Provisional application No. 63/438,347, filed on Jan. 11, 2023.

(51) Int. Cl.
*G06Q 10/00*     (2023.01)
*G06Q 10/0631*   (2023.01)

(52) U.S. Cl.
CPC .............. *G06Q 10/06312* (2013.01); *G06Q 10/063112* (2013.01)

(58) Field of Classification Search
CPC ................ G06Q 10/06312; G06Q 10/063112
See application file for complete search history.

(56) References Cited

U.S. PATENT DOCUMENTS

| 2011/0066938 A1* | 3/2011 | Nageswaram ....... G06Q 10/107 715/848 |
| 2014/0172753 A1  | 6/2014 | Nowozin et al. |

(Continued)

OTHER PUBLICATIONS

B. Lopes and R. L. Pereira, "ShopAssist—A unified location-aware system for shopping," 2016 Global Information Infrastructure and Networking Symposium (GIIS), Porto, Portugal, 2016, pp. 1-6 (Year: 2016).*

*Primary Examiner* — Matheus Ribeiro Stivaletti
(74) *Attorney, Agent, or Firm* — Banner & Witcoff, Ltd.

(57) ABSTRACT

Arrangements related to resource allocation are provided. A computing platform may receive a client request, and may input, into a resource allocation model, the client request, to identify one or more available resources for processing the client request. The computing platform may send, to user devices of the identified one or more available resources, requests to process the client request. The computing platform may receive, within a predetermined period of time, a response from at least one of the one or more available resources, indicating acceptance of the request to process the client request. The computing platform may select one of the one or more available resources, and may configure a virtual assistance session between the client and the selected resource to facilitate processing of the client request.

20 Claims, 9 Drawing Sheets

(56) References Cited

U.S. PATENT DOCUMENTS

| | | |
|---|---|---|
| 2017/0374090 A1 | 12/2017 | McGrew et al. |
| 2018/0033018 A1* | 2/2018 | Opalka ................ G06Q 30/016 |
| 2019/0028587 A1* | 1/2019 | Unitt ....................... H04L 67/51 |
| 2019/0028588 A1* | 1/2019 | Shinseki ............. H04M 3/5231 |
| 2019/0213099 A1 | 7/2019 | Schmidt et al. |
| 2020/0104364 A1 | 4/2020 | Yin et al. |
| 2020/0171382 A1 | 6/2020 | Agoston |
| 2020/0183369 A1 | 6/2020 | Kumar et al. |
| 2020/0210239 A1 | 7/2020 | Geigel |
| 2020/0387692 A1 | 12/2020 | Stokman et al. |
| 2020/0401849 A1 | 12/2020 | Kansal et al. |
| 2021/0073036 A1 | 3/2021 | Kim et al. |
| 2021/0097551 A1 | 4/2021 | Tzur et al. |
| 2021/0136006 A1 | 5/2021 | Casey et al. |
| 2021/0166184 A1 | 6/2021 | Fahham et al. |
| 2021/0345132 A1 | 11/2021 | Jagannath et al. |
| 2021/0383302 A1* | 12/2021 | Covell ................... G06N 20/00 |
| 2021/0398016 A1* | 12/2021 | Tsimerman ........... G06F 18/254 |
| 2022/0156117 A1 | 5/2022 | Chen et al. |
| 2022/0179691 A1 | 6/2022 | Chen et al. |
| 2022/0180290 A1 | 6/2022 | Xin et al. |
| 2022/0374274 A1 | 11/2022 | Chen et al. |
| 2023/0071278 A1 | 3/2023 | Karri et al. |
| 2023/0088733 A1 | 3/2023 | Bin Sediq et al. |

* cited by examiner

VIRTUAL, REAL-TIME, AND DYNAMIC AVAILABILITY MONITORING TO ENABLE MULTI-CHANNEL POINT-TO-POINT COMMUNICATION

CROSS-REFERENCE TO RELATED APPLICATIONS

This application claims the benefit of and priority to U.S. Provisional Patent Application Ser. No. 63/438,347, filed Jan. 11, 2023, and entitled "Virtual, Real-Time, and Dynamic Availability Monitoring to Enable Multi-Channel Point-To-Point Communication," which is incorporated by reference herein in its entirety.

BACKGROUND

Aspects of the disclosure relate to computer hardware and software for resource allocation. In some instances, physical locations of enterprise organizations providing client services may be at full capacity (e.g., all available representatives may be occupied, and a wait time may be imposed on further clients). In some instances, however, other locations of the organization might not face the same volume of clients at any given moment. Due to the physical limitations of these locations, however, it may be difficult to provide real-time distribution of representatives so as to reduce wait times. Such delays may contribute to operational inefficiencies and/or negative client experiences. Accordingly, it may be important to provide improved resource allocation.

SUMMARY

Aspects of the disclosure provide effective, efficient, scalable, and convenient technical solutions that address and overcome the technical problems associated with resource allocation. In accordance with one or more embodiments of the disclosure, a computing platform comprising at least one processor, a communication interface, and memory storing computer-readable instructions may receive a client request, where: 1) the client request indicates an intent of a corresponding client, 2) the client request indicates that in-person assistance at a physical location of an enterprise corresponding to the computing platform is requested, and 3) all physical resources at the physical location are currently unavailable to assist in processing the client request. The computing platform may input, into a resource allocation model, the intent to identify one or more available resources for processing the client request, where the one or more available resources may be located at locations different than the physical location, and identifying the one or more available resources may include: a) identifying a first subset of resources without a current scheduling conflict, b) identifying, within the first subset of resources, a second subset of resources comprising a requisite skill level to process the client request, and c) identifying, within the second subset of resources, the one or more available resources by identifying resources, of the second subset of resources, comprising an available status. The computing platform may send, to user devices of the one or more available resources, requests to process the client request. The computing platform may receive, within a predetermined period of time, a response from at least one of the one or more available resources, indicating acceptance of the request to process the client request. The computing platform may select one of the one or more available resources. The computing platform may configure a virtual assistance session between the client and the selected resource to facilitate processing of the client request.

In one or more examples, receiving the client request may include receiving, from an enterprise user device located within the physical location, the client request. In one or more examples, the client request may be input via a display of the enterprise user device by an employee of the enterprise upon arrival of the client at the physical location.

In one or more instances, receiving the client request may include receiving, from a client device, the client request, and where the client request may be input via a display of the client device by the client at a location different than the physical location. In one or more instances, the computing platform may train the resource allocation model using historical information, which may include one or more of: employee skills information, employee availability information, language preference information, geographic information, client feedback information, employee attendance schedules, holiday information, time information, date information, location popularity information, and client/employee relationship information.

In one or more examples, receiving the response from at least one of the one or more available resources may include receiving responses from at least two available resources. In one or more examples, selecting the one of the one or more available resources may include: 1) inputting identities of the at least two available resources and the client request into the resource allocation model to produce a resource allocation score for each of the at least two available resources; 2) ranking, based on the resource allocation scores, the at least two available resources; and 3) selecting a highest ranked resource of the at least two available resources.

In one or more instances, configuring the virtual assistance session may include configuring a live customer assistance session at the physical location using an enterprise user device provided to the client, where the enterprise user device may be configured to communicate with a user device of the selected resource. In one or more instances, configuring the virtual assistance session may include configuring a live customer assistance session at the physical location using a client device of the client, where the client device may be configured to communicate with a user device of the selected resource upon selection of a secure access link provided to the client device.

In one or more examples, configuring the virtual assistance session may include configuring a live customer assistance session at a location of the client, different than the physical location, by establishing a secure session between a mobile banking application running on a client device of the client and a user device of the selected resource. In one or more examples, the one or more available resources may include resources located at one of more of: a different physical location of the enterprise or a remote work location.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
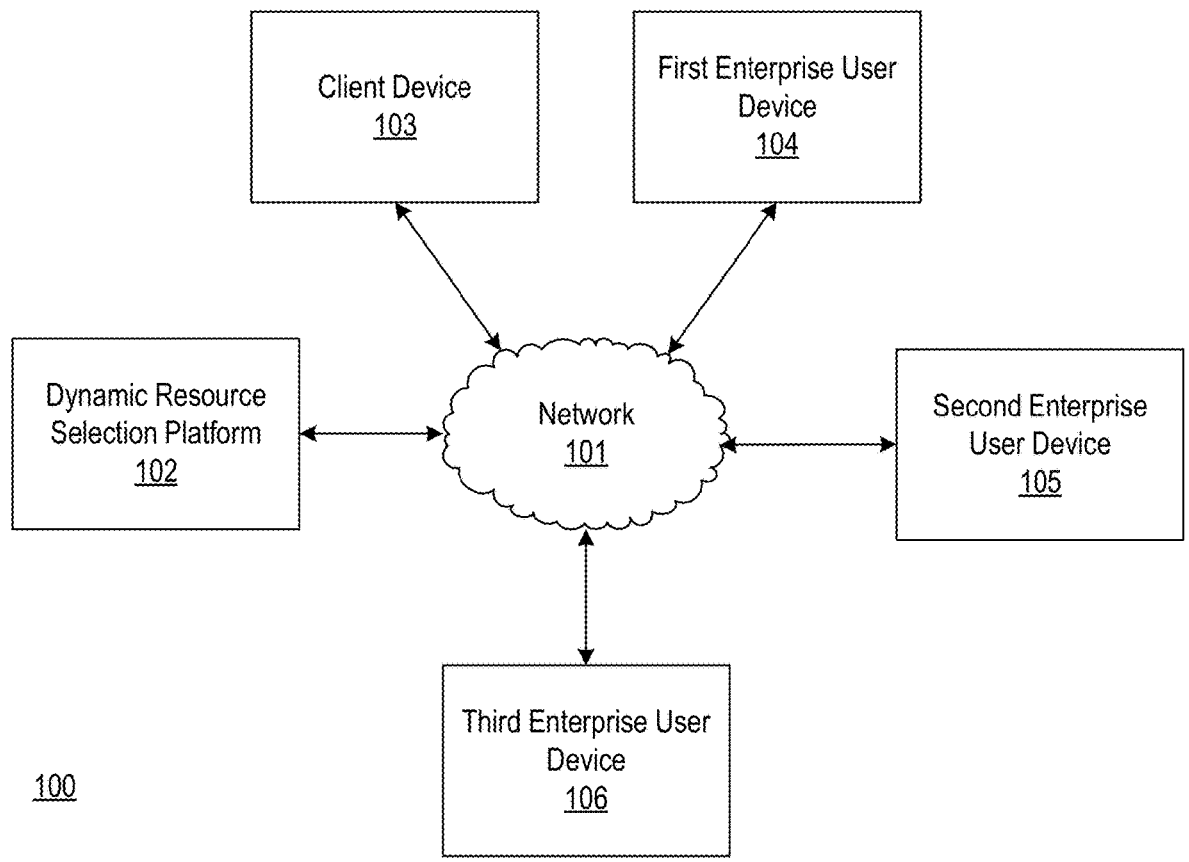
FIGS. 1A-1B depict an illustrative computing environment for dynamic resource allocation in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction of the concepts described in further detail below, systems and methods for improved resource allocation are described herein. For example, in certain instances (e.g., times of disruption, high traffic times, and/or otherwise), associate availability at an enterprise (such as a financial institution) may be stressed, which may negatively impact wait times.

To address this deficiency, as described further herein, clients may be provided with visibility into associate availability within the client's market, across various channels (e.g., financial centers, call centers, non-financial centers, artificial intelligence, and/or otherwise) and across multiple devices. This may provide clients with the option to connect with a physical representative regardless of the situation and location of each party. Any amount of associate capacity may be flexed for a given center in a matter of minutes. In some instances, a hierarchy of availability may be created (e.g., local market, then neighboring market, then regional market, then national market, then call center, or the like) so as to enable physical associates to easily support other time zones, flex financial centers, flex virtual interactions, and/or otherwise. In some instances, the client may be connected with an associate based upon the client's needs and associate skillsets. In some instances, these capabilities may straddle both the physical and digital environments (and may provide the capability to convert from a physical interaction to virtual interaction instantaneously), which may allow for associate capacity to be immediately pivoted to support virtual needs.

As a result, the systems and methods described herein may: 1) support constant monitoring of associate availability in an omni-channel fashion including artificial intelligence, 2) connect clients and associates based upon client needs and associate skillsets, 3) have a market level focus (e.g., connecting a client to an associate in their market regardless of each parties' location), 4) span physical and digital environments, 5) provide load balancing across time zones, and 6) provide real time capability to convert from a physical environment to a virtual environment instantaneously (e.g., so associate capacity may be immediately pivoted to virtual needs).

Figure 1B:
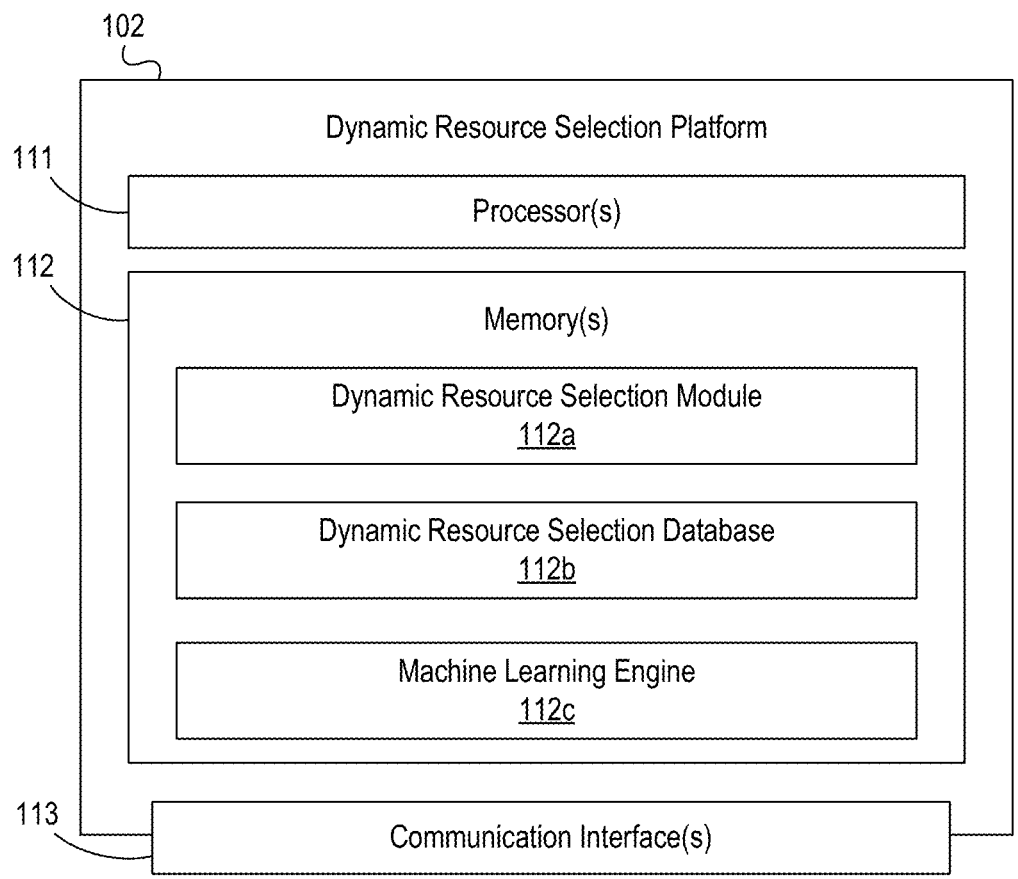

FIGS. 1A-1B depict an illustrative computing environment for dynamic resource allocation in accordance with one or more example embodiments. Referring to FIG. 1A, computing environment 100 may include one or more computer systems. For example, computing environment 100 may include a dynamic resource selection platform 102, a client device 103, first enterprise user device 104, second enterprise user device 105, and third enterprise user device 106.

As described further below, dynamic resource selection platform 102 may be a computer system that includes one or more computing devices (e.g., servers, server blades, or the like) and/or other computer components (e.g., processors, memories, communication interfaces) that may be used to provide resource selection functions for clients and employees.

Client device 103 may be and/or otherwise include a laptop computer, desktop computer, mobile device, tablet, smartphone, and/or other device that may be used by an individual (such as a client of a financial institution). In some instances, client device 103 may be configured to display one or more user interfaces (e.g., communication session interfaces, resource selection interfaces, or the like). Although a single client device 103 is shown, any number of user devices may be deployed in the systems/methods described below without departing from the scope of the disclosure.

First enterprise user device 104 may be and/or otherwise include a laptop computer, desktop computer, mobile device, tablet, smartphone, and/or other device that may be used by an individual (such as an employee of a financial institution). In some instances, first enterprise user device 104 may be configured to display one or more user interfaces (e.g., communication session interfaces, resource selection interfaces, or the like). For illustrative purposes, first enterprise user device 104 may be a user device operated by a lobby leader and/or other employee who may greet and/or otherwise welcome clients into a physical premises (e.g., of a financial institution and/or other enterprise).

Second enterprise user device 105 may be and/or otherwise include a laptop computer, desktop computer, mobile device, tablet, smartphone, and/or other device that may be used by an individual (such as an employee of a financial institution). In some instances, second enterprise user device 105 may be configured to display one or more user interfaces (e.g., communication session interfaces, client request notifications, or the like). For illustrative purposes, second enterprise user device 105 may be a user device operated by an employee (e.g., of a financial institution and/or other enterprise) who might not be located on the physical premises of the first enterprise user device 104, and to which a request to remotely assist with a client request may be sent.

Third enterprise user device 106 may be and/or otherwise include a laptop computer, desktop computer, mobile device, tablet, smartphone, and/or other device that may be used by an individual (such as an employee of a financial institution). In some instances, third enterprise user device 106 may be configured to display one or more user interfaces (e.g., communication session interfaces, or the like). For illustrative purposes, third enterprise user device 106 may be a user device maintained at the physical premises (e.g., of a financial institution and/or other enterprise) and provided to clients to engage in virtual communication sessions with remotely located employees to process client requests.

Computing environment 100 also may include one or more networks, which may interconnect dynamic resource selection platform 102, client device 103, first enterprise user device 104, second enterprise user device 105, third enterprise user device 106, or the like. For example, computing environment 100 may include a network 101 (which may interconnect, e.g., dynamic resource selection platform 102, client device 103, first enterprise user device 104, second enterprise user device 105, third enterprise user device 106, or the like).

In one or more arrangements, dynamic resource selection platform 102, client device 103, first enterprise user device 104, second enterprise user device 105, and third enterprise user device 106 may be any type of computing device capable of sending and/or receiving requests and processing the requests accordingly. For example, dynamic resource selection platform 102, client device 103, first enterprise user device 104, second enterprise user device 105, third enterprise user device 106 and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of dynamic resource selection platform 102, client device 103, first enterprise user device 104, second enterprise user device 105, and/or third enterprise user device 106 may, in some instances, be special-purpose computing devices configured to perform specific functions.

Referring to FIG. 1B, dynamic resource selection platform 102 may include one or more processors 111, memory 112, and communication interface 113. A data bus may interconnect processor 111, memory 112, and communication interface 113. Communication interface 113 may be a network interface configured to support communication between dynamic resource selection platform 102 and one or more networks (e.g., network 101, or the like). Memory 112 may include one or more program modules having instructions that when executed by processor 111 cause dynamic resource selection platform 102 to perform one or more functions described herein and/or one or more databases that may store and/or otherwise maintain information which may be used by such program modules and/or processor 111. In some instances, the one or more program modules and/or databases may be stored by and/or maintained in different memory units of dynamic resource selection platform 102 and/or by different computing devices that may form and/or otherwise make up dynamic resource selection platform 102. For example, memory 112 may have, host, store, and/or include dynamic resource selection module 112*a*, dynamic resource selection database 112*b*, and/or machine learning engine 112*c*.

Dynamic resource selection module 112*a* may have instructions that direct and/or cause dynamic resource selection platform 102 to provide improved resource allocation techniques, as discussed in greater detail below. Dynamic resource selection database 112*b* may store information used by dynamic resource selection module 112*a* and/or dynamic resource selection platform 102 in application of advanced techniques to provide improved resource selection mechanisms, and/or in performing other functions. Machine learning engine 112*c* may train, host, and/or otherwise refine a model that may be used to perform dynamic resource selection, and/or other functions.

Figure 2A:
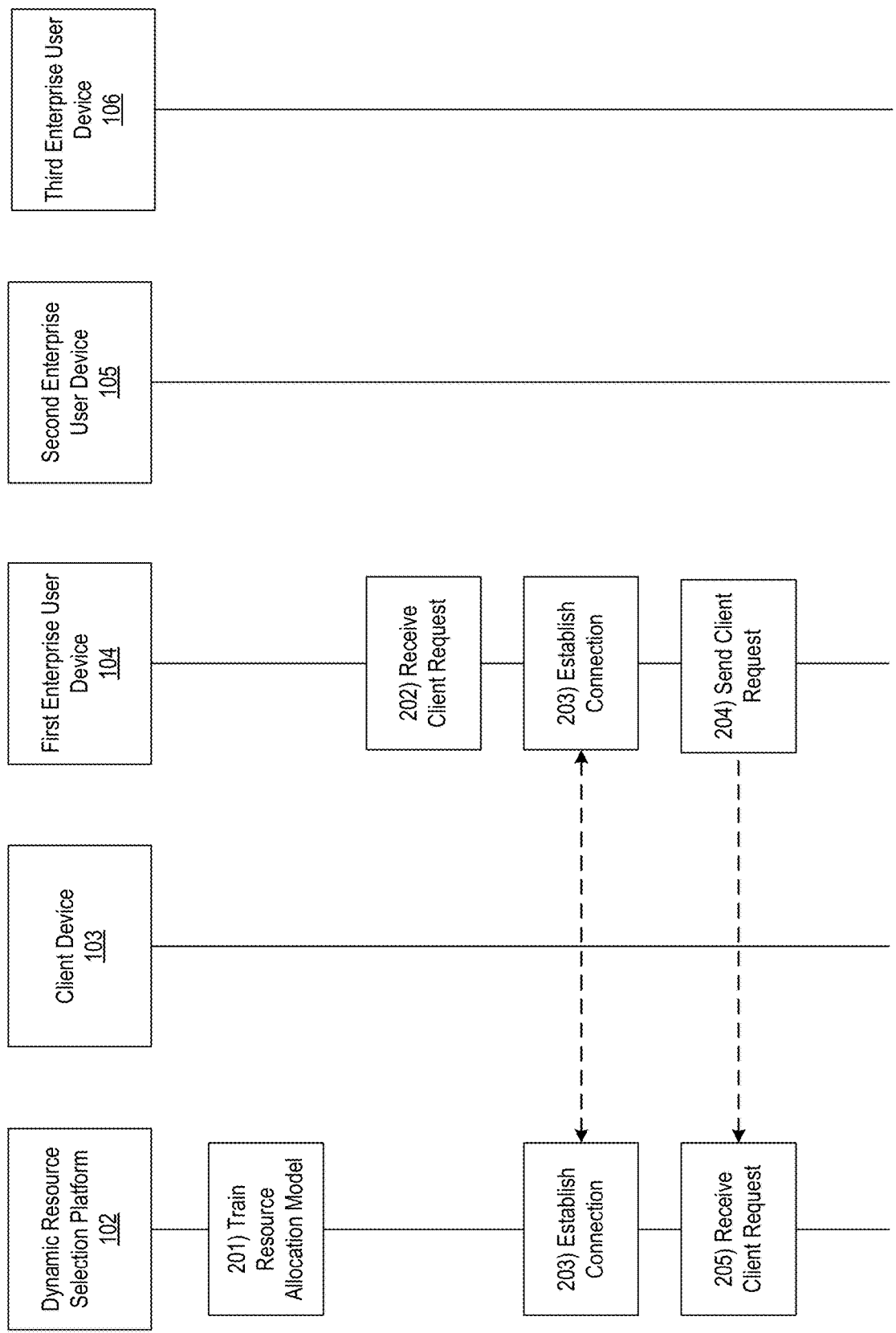
FIGS. 2A-2D depict an illustrative event sequence for dynamic resource allocation in accordance with one or more example embodiments.

FIGS. 2A-2D depict an illustrative event sequence for dynamic resource allocation in accordance with one or more example embodiments. Referring to FIG. 2A, at step 201, the dynamic resource selection platform 102 may train a resource allocation model. For example, the dynamic resource selection platform 102 may train the resource allocation model to identify employees available and able to assist with various client requests. For example, the dynamic resource selection platform 102 may receive historical client requests (e.g., including client intent), client information (e.g., geographic location, account information, language preferences, feedback information, previous employee relationships, and/or other information), employee information (e.g., skillset, customer ratings, geographic location, availability, language skills, attendance schedules, and/or other information), holiday information, time information, date information, location popularity information, and/or other information and input the information into the resources allocation model to train the resource allocation to establish stored correlations between such information and employees that assisted with the corresponding client requests. In doing so, the dynamic resource selection platform 102 may train the resource allocation model to identify, based on a given client request, one or more employees available and capable of assisting with the client request. In some instances, this may include employees located in different physical locations (e.g., different branch locations, remote workers, and/or otherwise) across an enterprise.

Additionally or alternatively, in training the resource allocation model, the dynamic resource selection platform 102 may train the resource allocation model (e.g., by providing one or more rules to the resource allocation model) to identify a ranking and/or implement another hierarchical system for selecting available resources. For example, the resource allocation model may be trained to first select resources from a local market, then one or more neighboring markets, then a regional market, then a national market, and then a call center. Additionally or alternatively, the resource allocation model may be trained to rank employees with a higher customer satisfaction rating higher than those with lower customer satisfaction ratings. In some instances, the resource allocation model may be trained to score available resources for selection in processing a given client request, rank the resources based on the scores, and select the highest ranked resource.

In some instances, in training the resource allocation model, the dynamic resource selection platform 102 may train a supervised learning model (e.g., decision tree, bagging, boosting, random forest, neural network, linear regression, artificial neural network, support vector machine, and/or other supervised learning model), unsupervised learning model (e.g., classification, clustering, anomaly detection, feature engineering, feature learning, and/or other unsupervised learning models), and/or other model.

Figure 4:
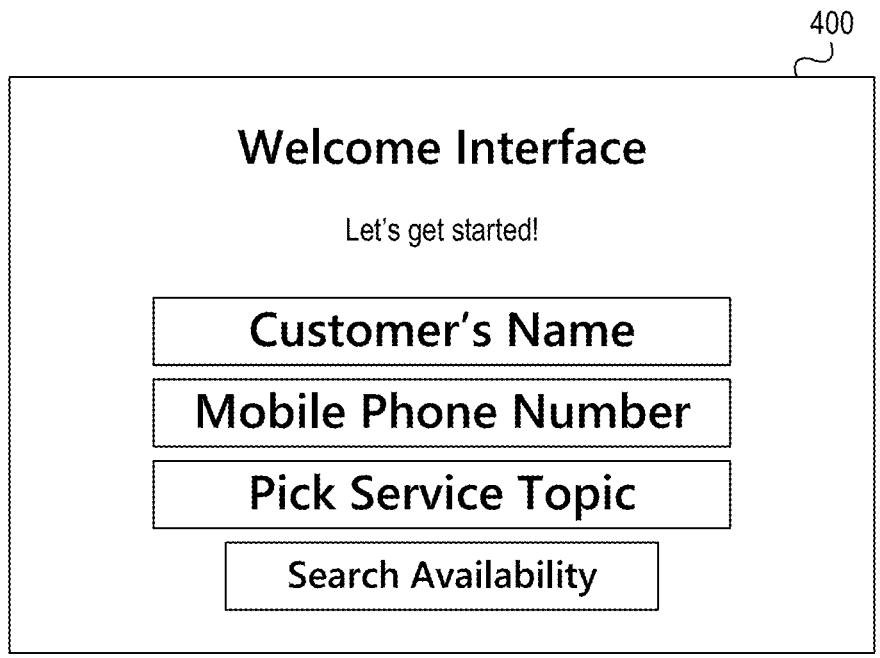
FIGS. 4-6 depict illustrative user interfaces for dynamic resource allocation in accordance with one or more example embodiments.

At step 202, the first enterprise user device 104 may receive a client request (e.g., a request for service from an enterprise organization such as a financial institution). For example, a request may indicate that in person assistance at a physical location/premises of the enterprise is requested. In some instances, the client request may indicate an intent of the client. In some instances, the first enterprise user device 104 may be located at a physical premises of the enterprise organization from which service is requested, and may receive the client request via an interface of the first enterprise user device 104. For example, a client may arrive at the physical premises, and speak with an employee of the enterprise organization, who may input the client request and/or other client information into the first enterprise user device 104 for transmission to the dynamic resource selection platform 102 (e.g., via a graphical user interface similar to graphical user interface 400, which is illustrated in FIG. 4). In some instances, at the time the client request is received, all physical resources at the physical location may be currently unavailable to assist in processing the client request. For example, all present service representatives may be assisting other clients and/or otherwise occupied. In some instances, the client request may be received from a client device (e.g., client device 103). For example, the client may input the client request on their device (e.g., through a mobile banking and/or other application) from home, en route to the enterprise organization, and/or at other locations.

At step 203, the first enterprise user device 104 may establish a connection with the dynamic resource selection platform 102. For example, the first enterprise user device 104 may establish a first wireless data connection with the dynamic resource selection platform 102 to link the first enterprise user device 104 to the dynamic resource selection platform 102 (e.g., in preparation for sending client requests). In some instances, the first enterprise user device 104 may identify whether or not a connection is already established with the dynamic resource selection platform 102. If a connection is already established with the dynamic resource selection platform 102, the first enterprise user device 104 might not re-establish the connection. If a connection is not yet established with the dynamic resource selection platform 102, the first enterprise user device 104 may establish the first wireless data connection as described herein.

At step 204, the first enterprise user device 104 may send the client request to the dynamic resource selection platform 102. For example, the first enterprise user device 104 may send the client request to the dynamic resource selection platform 102 while the first wireless data connection is established.

At step 205, the dynamic resource selection platform 102 may receive the client request sent at step 204. For example, the dynamic resource selection platform 102 may receive the client request via the communication interface 113 and while the first wireless data connection is established. In some instances, the dynamic resource selection platform 102 may receive the client request from the client device 103 (e.g., rather than the first enterprise user device 104).

Figure 2B:
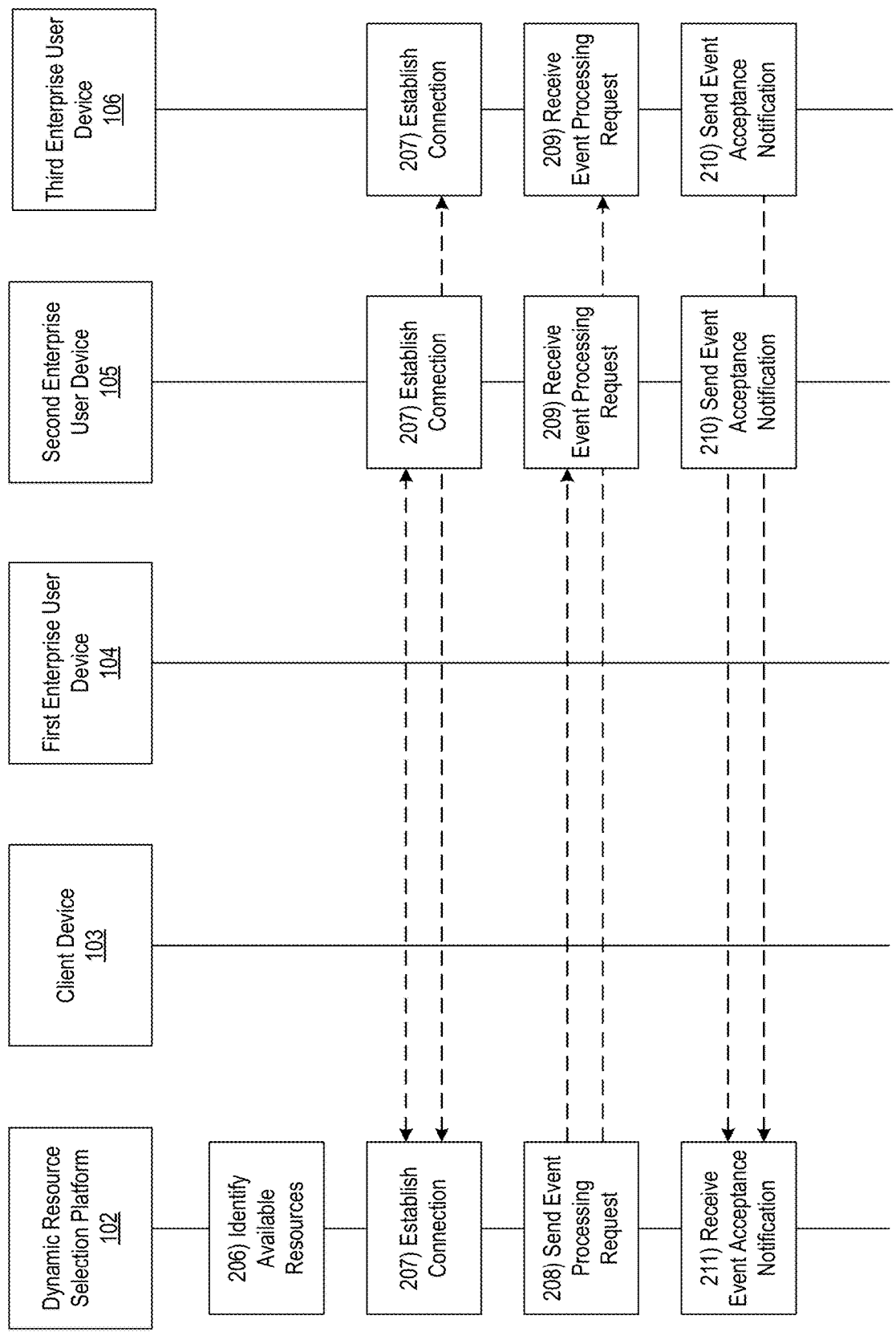

Referring to FIG. 2B, at step 206, the dynamic resource selection platform 102 may identify available resources for processing the client request. For example, the dynamic resource selection platform 102 may input the client request into the resource allocation model to identify available and able resources for processing the client request. For example, the dynamic resource selection platform 102 may use the resource allocation model to first identify resources without an immediate scheduling conflict (e.g., by checking electronic schedules of all enterprise employees). After identifying resources without a scheduling conflict, the dynamic resource selection platform 102 may use the resource allocation model to identify resources with a requisite skillset to assist with the client request. For example, based on an intent of the client, identified in the client request, the resource allocation model may identify the requisite skillset. Then, the resource allocation model may use a skills matrix (e.g., which may have been configured during the training of the resource allocation model), identifying skillsets of the enterprise employees, to identify a subset of the enterprise employees, without an immediate scheduling conflict, that possess the requisite skillset. After identifying this subset of the enterprise employees, the resource allocation model may identify a further subset of employees, without a scheduling conflict and possessing the requisite skillset, who have a currently available status indicator. In some instances, this further subset of employees may be located at locations different than the physical location of the client. For example, they may be located at different branch locations of the enterprise, remotely located, and/or otherwise located at different locations.

In some instances, the resource allocation model may produce quality scores for the subset of employees (e.g., indicating a likelihood of service quality based on their skills, past experience, reviews, or the like), and may rank the subset of employees according to these quality scores. In these instances, the resource allocation model may compare these scores to a threshold (e.g., a particular score value, top X number of scores, within a particular number of standard deviations of a maximum score, or the like), and may only select the employees associated with scores that meet or exceed the threshold.

At step 207, the dynamic resource selection platform 102 may establish connections with enterprise user devices for employees selected at step 206 (which, for illustrative purposes, may include the second enterprise user device 105 and/or the third enterprise user device 106). For example, the dynamic resource selection platform 102 may establish a second and/or third wireless data connection with the second enterprise user device 105 and/or the third enterprise user device 106 to link the dynamic resource selection platform 102 to the second and/or third enterprise user devices 105 and 106 (e.g., in preparation for sending event processing requests). In some instances, the dynamic resource selection platform 102 may identify whether or not connections are already established with the second and/or third enterprise user devices 105 and 106. If connections are already established, the dynamic resource selection platform 102 might not re-establish the connections. If connections are not yet established, the dynamic resource selection platform 102 may establish the second and/or third wireless data connections as described herein.

At step 208, the dynamic resource selection platform 102 may send the event processing request to the second and/or third enterprise user devices 105 and 106. For example, the dynamic resource selection platform 102 may send the event processing request to the second and/or third enterprise user devices 105 and 106 via the communication interface 113 and while the second and/or third wireless data connections are established.

Figure 5:

At step 209, the second and/or third enterprise user devices 105 and 106 may receive the event processing request. For example, the second and/or third enterprise user devices 105 and 106 may receive the event processing request while the second and/or third wireless data connection is established. In these instances, the second and/or third enterprise user devices 105 and/or 106 may prompt the corresponding users for acceptance of the client request. For example, the second enterprise user device 105 and/or third enterprise user device 106 may display a graphical user interface similar to graphical user interface 500, which is illustrated in FIG. 5. If the second and/or third enterprise user devices 105 and 106 receive an acceptance input, they may proceed to step 210. Otherwise, they may send a rejection of the request, which may in some instances, prompt the dynamic resource selection platform to return to step 206 to identify additional resources (e.g., if no previously selected resources accept the request). In some instances, the event processing request may be time limited (e.g., the users have 10 seconds, 60 seconds, or the like to respond), and if a response is not received within the time limit, it may be treated as a failure to accept (e.g., a rejection of the request).

At step 210, the second and/or third enterprise user devices 105 and/or 106 may send an acceptance notification to the dynamic resource selection platform 102, which may e.g., indicate that they accept the request. In some instances, the second and/or third enterprise user devices 105 and/or 106 may send the acceptance notification to the dynamic resource selection platform 102 while the second and/or third wireless data connection is established.

At step 211, the dynamic resource selection platform 102 may receive the event acceptance notification sent at step 210. For example, the dynamic resource selection platform 102 may receive the event acceptance notification via the communication interface 113 and while the second and/or third wireless data connection is established.

Figure 2C:
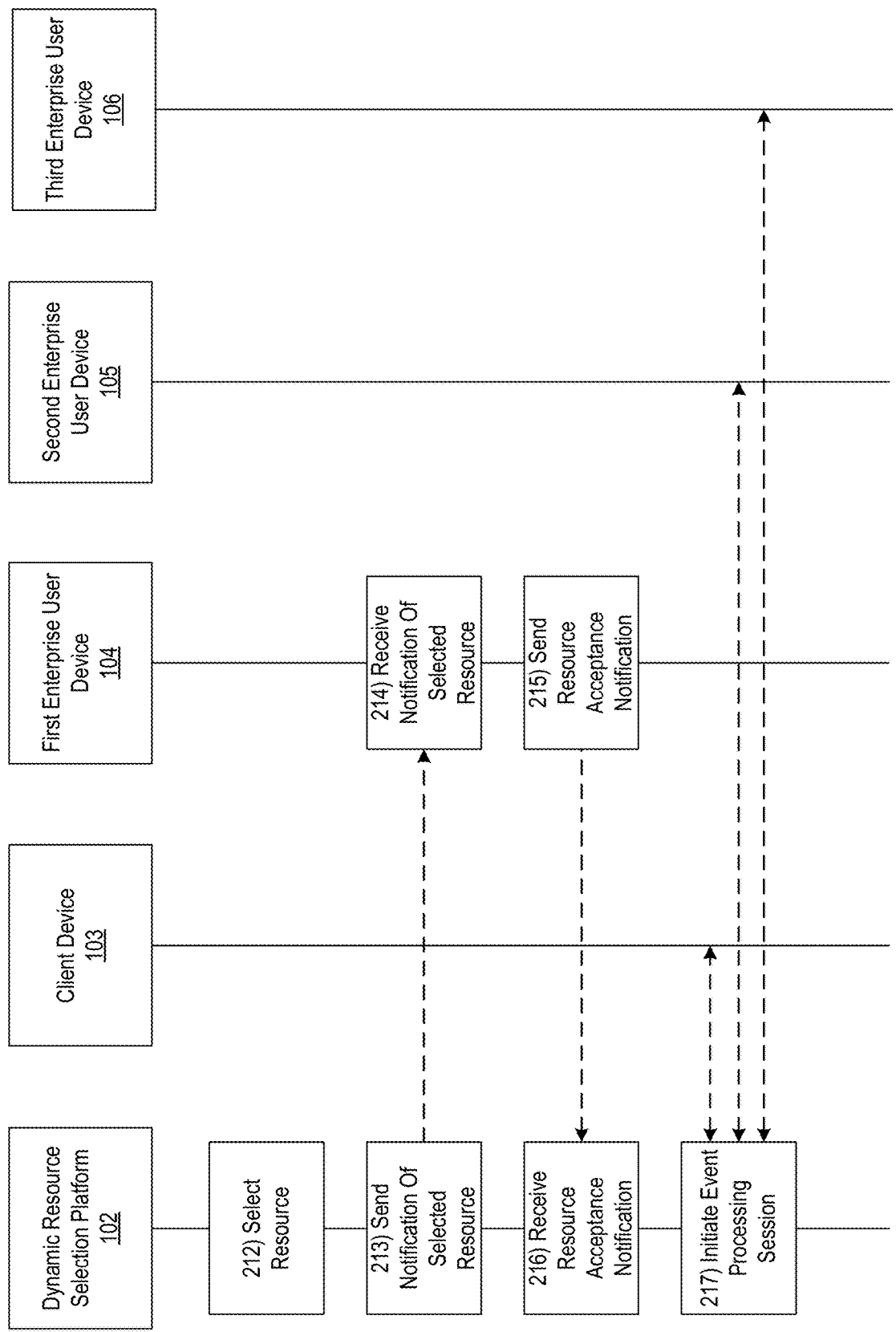

Referring to FIG. 2C, at step 212, the dynamic resource selection platform 102 may feed the resources corresponding to acceptance notifications (e.g., users of the second enterprise user device 105 and/or third enterprise user device 106) back into the resource allocation model to identify which has a higher quality score. In these instances, the dynamic resource selection platform 102 may select the highest ranked resource. In some instances, rather than identifying the resource with the highest quality score, the dynamic resource selection platform 102 may select resource from which a first response was received (e.g., the first responder to the event processing request).

At step 213, the dynamic resource selection platform 102 may send a notification of the selected resource to the first enterprise user device 104, and the notification may indicate the selected resource from step 212. For example, the dynamic resource selection platform may send the notification of the selected resource via the communication interface 113 and while the first wireless data connection is established. In some instances, the dynamic resource selection platform 102 may also send one or more commands directing the first enterprise user device 104 to display the notification of the selected resource, which may, e.g., cause the first enterprise user device 104 to display the notification of the selected resource.

At step 214, the first enterprise user device 104 may receive the notification of the selected resource. For example, the first enterprise user device 104 may receive the notification while the first wireless data connection is established. In some instances, the first enterprise user device 104 may also receive the one or more commands directing the first enterprise user device 104 to display the notification of the selected resource. In these instances, a user of the first enterprise user device 104 may present the selected resource for acceptance by the individual corresponding to the client request. If the individual accepts the resource, the event sequence may proceed to step 215. Otherwise, the dynamic resource selection platform 102 may return to identify and/or select an updated resource. In some instances, the notification of the selected resource may be sent directly to the client device 103 for display.

At step 215, the first enterprise user device 104 may send the resource acceptance notification to the dynamic resource selection platform 102. For example, the first enterprise user device 104 may send the resource acceptance notification to the dynamic resource selection platform 102 while the first wireless data connection is established.

At step 216, the dynamic resource selection platform 102 may receive the resource acceptance notification sent at step 215. For example, the dynamic resource selection platform 102 may receive the resource acceptance notification via the communication interface 113 and while the first wireless data connection is established.

Figure 6:
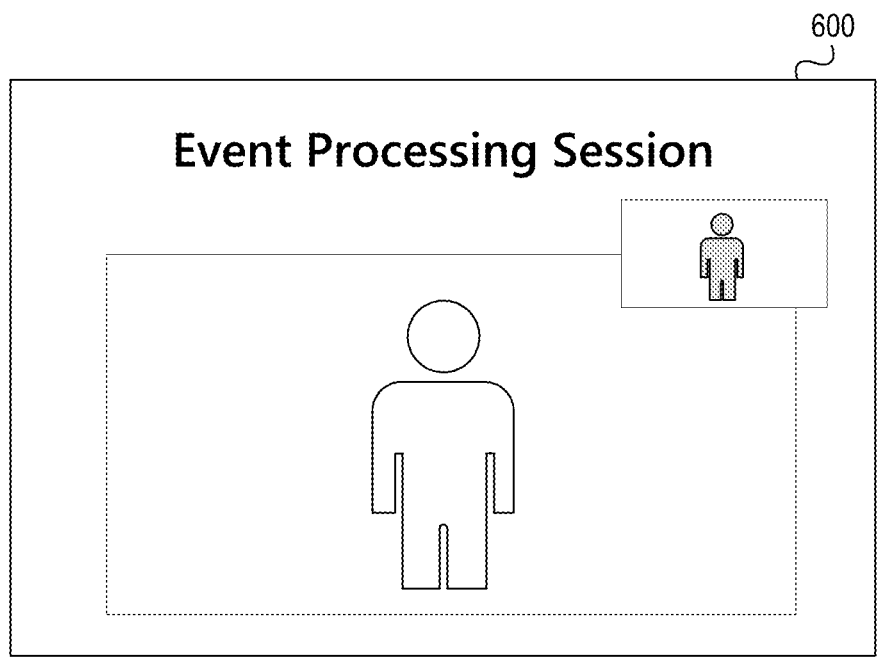

At step 217, the dynamic resource selection platform 102 may communicate with the client device 103 and the accepted resource (e.g., the second enterprise user device 105, third enterprise user device 106, or other user device) to initiate a virtual experience/event processing session/live (e.g., real time) customer assistance session for accomplishing and/or otherwise processing the client request. For example, the client device 103 and the corresponding enterprise user device may display a video conferencing session (e.g., similar to the graphical user interface 600, which is displayed in FIG. 6), and/or other conferencing session. In some instances, the dynamic resource selection platform 102 may facilitate the virtual experience on an enterprise device (e.g., third enterprise user device 106) provided to the client. Alternatively, the dynamic resource selection platform 102 may facilitate the virtual experience on the client's own device (e.g., client device 103). For example, a secure access link may be provided to the client device 103, which may be used to access the customer assistance session. Additionally or alternatively, the client device 103 may access the customer assistance session via a mobile banking application executing at the client device 103. In some instances, the virtual experience may be facilitated between the client and an employee who may be located at another branch location, a remote work location, and/or other location different than the physical premises at which the client is located.

Figure 2D:
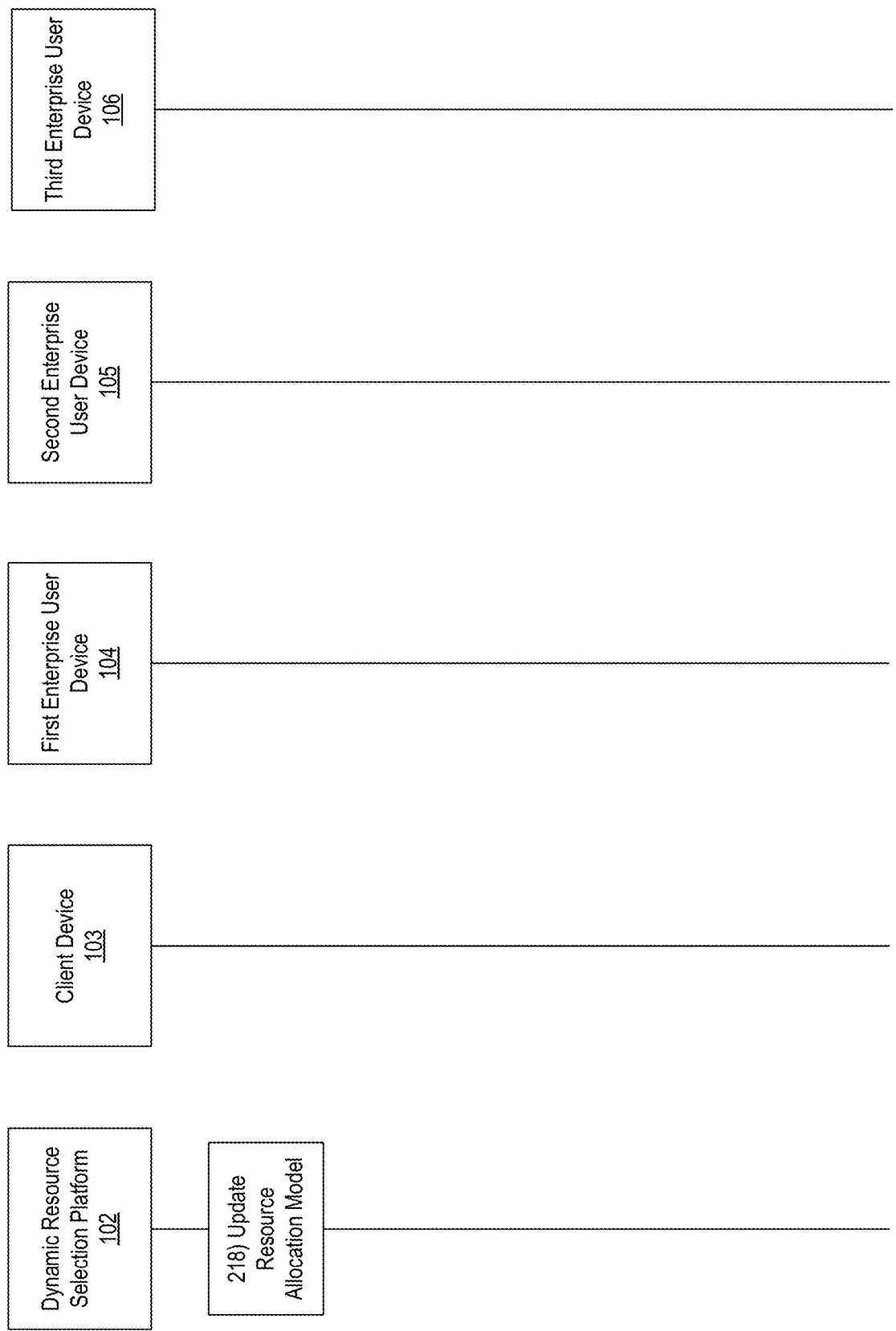

Referring to FIG. 2D, at step 218, the dynamic resource selection platform 102 may update the resource allocation model based on the selected resource, the client request, and/or other information (e.g., user feedback, or the like). In doing so, the dynamic resource selection platform 102 may continue to refine the dynamic resource selection platform 102 using a dynamic feedback loop, which may, e.g., increase the accuracy and effectiveness of the model in recommending resources for event processing.

For example, the dynamic resource selection platform 102 may use the selected resource, client request, user feedback, and/or other information to reinforce, modify, and/or otherwise update the resource allocation model, thus causing the model to continuously improve (e.g., in terms of recommending resources).

In some instances, the dynamic resource selection platform 102 may continuously refine the resource allocation model. In some instances, the dynamic resource selection platform 102 may maintain an accuracy threshold for the resource allocation model, and may pause refinement (through the dynamic feedback loops) of the model if the corresponding accuracy is identified as greater than the corresponding accuracy threshold. Similarly, if the accuracy fails to be equal or less than the given accuracy threshold, the dynamic resource selection platform 102 may resume refinement of the model through the corresponding dynamic feedback loop.

By operating in this way, the dynamic resource selection platform 102 may enable an efficient allocation of resources, and may be able to utilize remote resources to process live in person requests at a particular enterprise location. Similarly, the dynamic resource selection platform 102 may extend the capabilities of a particular type of employee (e.g., a specialist) who may only be located at a certain location, thus making that employee available across a variety of different locations. Furthermore, the dynamic resource selection platform 102 may enable the reorganization of resources among physical locations for various reasons (e.g., natural disaster, branch closure, and/or other reasons).

Figure 3:
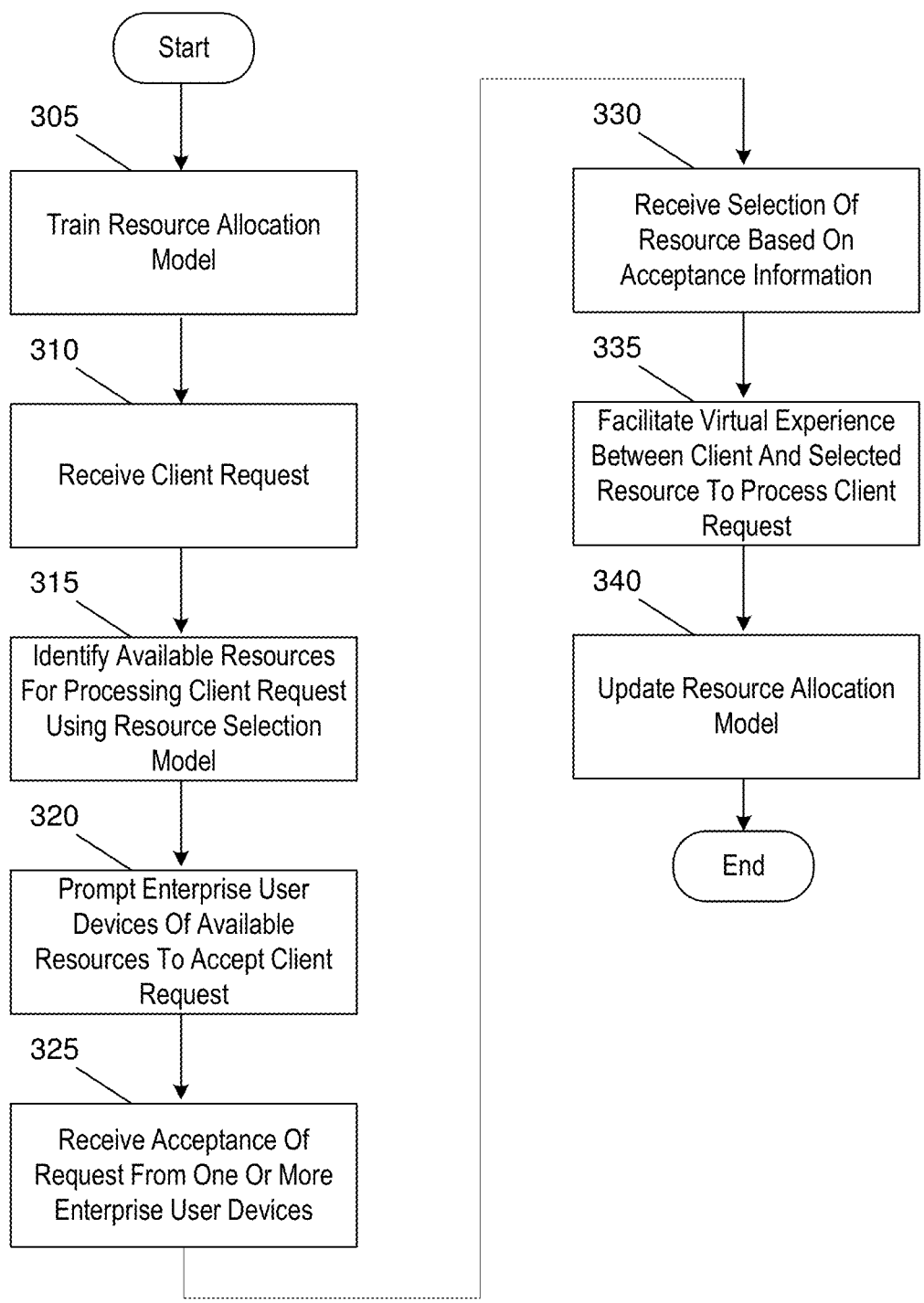
FIG. 3 depicts an illustrative method for dynamic resource allocation in accordance with one or more example embodiments.

FIG. 3 depicts an illustrative method for dynamic resource allocation in accordance with one or more example embodiments. At step 305, a computing platform (e.g., the dynamic resource selection platform 102) having at least one processor, a communication interface, and memory may train, using historical information, a resource allocation model (e.g., to identify employees available and able to assist with various client requests). For example, the computing platform may input historical client requests (e.g., including client intent), client information (e.g., geographic location, account information, language preferences, feedback information, previous employee relationships, and/or other information), employee information (e.g., skillset, customer ratings, geographic location, availability, language skills, attendance schedules, and/or other information), holiday information, time information, date information, location popularity information, into the resource allocation model so as to train the resource allocation model to identify, based on a given client request, one or more employees available and capable of assisting with the client request. In some instances, this may include employees located in different physical locations (e.g., different branch locations, remote workers, and/or otherwise) across an enterprise. By feeding this historical information into the resource allocation model, the computing platform may train the resource allocation model to establish correlations between various client requests and corresponding employees who provided assistance for such requests.

Additionally or alternatively, in training the resource allocation model, the computing platform may train the resource allocation model (e.g., by providing one or more rules to the resource allocation model) to identify a ranking and/or other hierarchical system for selecting available resources. For example, the resource allocation model may be trained to first select resources from a local market, then one or more neighboring markets, then a regional market, then a national market, and then a call center. Additionally or alternatively, the resource allocation model may be trained to rank employees with a higher customer satisfaction rating higher than those with lower customer satisfaction ratings. In some instances, in training the resource allocation model, the computing platform may train a supervised learning model (e.g., decision tree, bagging, boosting, random forest, neural network, linear regression, artificial neural network, support vector machine, and/or other supervised learning model), unsupervised learning model (e.g., classification, clustering, anomaly detection, feature engineering, feature learning, and/or other unsupervised learning models), and/or other model.

At step 310, the computing platform may receive a client request (e.g., a request for service from an enterprise organization such as a financial institution). For example, a request may indicate that in person assistance at a physical location/premises of the enterprise is requested. In some instances, the client request may indicate an intent of the client (e.g., a request for assistance on a particular topic such as opening an account, purchasing a financial product, applying for a service, and/or other topics). In some instances, this request may be received from an enterprise user device (e.g., enterprise user device 104) located at a physical premises of the enterprise organization from which service is requested. For example, a client may arrive at the physical premises, and speak with an employee of the enterprise organization, who may input the client request and/or other client information into the enterprise user device for transmission to the computing platform. In some instances, at the time the client request is received, all physical resources at the physical location may be currently unavailable to assist in processing the client request. For example, all present service representatives may be assisting other clients and/or otherwise occupied. In some instances, the client request may be received from a client device. For example, the client may input the client request on their device (e.g., through a mobile banking and/or other application) from home, en route to the enterprise organization, and/or at other locations.

At step 315, the computing platform may input the client request into the resource allocation model to identify available and able resources for processing the client request. For example, the computing platform may use the resource allocation model to first identify resources without an immediate scheduling conflict (e.g., by checking electronic schedules of all enterprise employees). After identifying resources without a scheduling conflict, the computing platform may use the resource allocation model to identify resources with a requisite skillset to assist with the client request. For example, based on an intent of the client, identified in the client request, the resource allocation model may identify the requisite skillset. Then, the resource allocation model may use a skills matrix, identifying skillsets of the enterprise employees, to identify a subset of the enterprise employees, without an immediate scheduling conflict, that possess the requisite skillset. After identifying this subset of the enterprise employees, the resource allocation model may identify a further subset of employees, without a scheduling conflict and possessing the requisite skillset, who have a currently available status indicator. In some instances, this further subset of employees may be located at locations different than the physical location of the client. For example, they may be located at different branch locations of the enterprise, remotely located, and/or otherwise located at different locations.

At step 320, the computing platform may send, to user devices of the identified resources, a prompt requesting assistance with the client request. For example, the computing platform may send the prompt to the identified further subset of employees. In some instances, this may be a prompt that identified the client request, and requests user input indicating whether or not assistance may be provided by the corresponding resource.

At step 325, the computing platform may receive, within a predetermined period of time, an acceptance notification from one or more of the user devices. For example, the computing platform may collect acceptance notifications over a period of time, such as ten second, before closing a request window (e.g., responses might not be accepted from resources who respond after expiration of the predetermined period of time). In some instances, these acceptance notifications may indicate a willingness and availability on behalf of the corresponding resource to provide assistance with the client request.

At step 330, the computing platform may present one of the identified resources to the client, and may prompt for client approval. In some instances, if acceptance notifications are received from multiple resources, the computing platform may rank the resources (e.g., using the resource allocation model), and may present the highest ranked resource for client approval. For example, the computing platform may rank available resources based on geographic location, customer satisfaction rating, and/or otherwise. If client approval is not received, the computing platform may continue to present alternative options until a selection is made. Otherwise, once the client approval is received, the computing platform may proceed to step 335.

At step 335, upon receiving the client approval, the computing platform may facilitate a virtual experience between the client and the approved resource to process the client request. In some instances, the computing platform may facilitate the virtual experience on an enterprise device (e.g., third enterprise user device 106) provided to the client. Alternatively, the computing platform may facilitate the virtual experience on the client's own device (e.g., client device 103). In some instances, the virtual experience may be facilitated between the client and an employee who may be located at another branch location, a remote work location, and/or other location different than the physical premises at which the client is located. At step 340, the computing platform may update the resource allocation model based on the client request, the selected resource, user feedback, and/or other information.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:
train a resource allocation model, wherein training the resource allocation model comprises:
establishing stored correlations between resources and using historical information associated with historical client requests, wherein the historical information includes one or more of: employee skills information, employee availability information, language preference information, geographic information, client feedback information, employee attendance schedules, holiday information, time information, date information, location popularity information, and client/employee relationship information,
configuring a hierarchical system, within the resource allocation model, indicating a priority in which resources from different markets are selected,
establishing a resource ranking based on satisfaction ratings, and
training one or more of: a decision tree model, bagging model, boosting model, random forest model, neural network, linear regression model, artificial neural network, support vector machine, classification model, clustering model, anomaly detection model, feature engineering model, or feature learning model, wherein training the resource allocation model configures the resource allocation model to identify, based on the stored correlations, the hierarchical system, and the resource ranking, one or more available resources for processing a given client request;
receive a client request, wherein:
the client request indicates an intent of a corresponding client,
the client request indicates that in person assistance at a physical location of an enterprise corresponding to the computing platform is requested, and
all physical resources at the physical location are currently unavailable to assist in processing the client request;

input, into the resource allocation model, the intent to identify one or more available resources for processing the client request, wherein the one or more available resources are located at locations different than the physical location, and wherein identifying the one or more available resources comprises:
 identifying a first subset of resources without a current scheduling conflict,
 identifying, within the first subset of resources, a second subset of resources comprising a requisite skill level to process the client request, and
 identifying, within the second subset of resources, the one or more available resources by identifying resources, of the second subset of resources, comprising an available status;
send, to user devices of the one or more available resources, requests to process the client request;
receive, within a predetermined period of time, a response from at least one of the one or more available resources, indicating acceptance of the request to process the client request;
select one of the one or more available resources;
configure a virtual assistance session between the client and the selected resource to facilitate processing of the client request; and
dynamically update, based on the client request, the selected resource, and user feedback, the resource allocation model to continuously improve accuracy of the resource allocation model.

2. The computing platform of claim 1, wherein receiving the client request comprises receiving, from an enterprise user device located within the physical location, the client request.

3. The computing platform of claim 2, wherein the client request is input via a display of the enterprise user device by an employee of the enterprise upon arrival of the client at the physical location.

4. The computing platform of claim 1, wherein receiving the client request comprises receiving, from a client device, the client request, and wherein the client request is input via a display of the client device by the client at a location different than the physical location.

5. The computing platform of claim 1, wherein receiving the response from at least one of the one or more available resources comprises receiving responses from at least two available resources.

6. The computing platform of claim 5, wherein selecting the one of the one or more available resources comprises:
 inputting identities of the at least two available resources and the client request into the resource allocation model to produce a resource allocation score for each of the at least two available resources;
 ranking, based on the resource allocation scores, the at least two available resources; and
 selecting a highest ranked resource of the at least two available resources.

7. The computing platform of claim 1, wherein configuring the virtual assistance session comprises:
 configuring a live customer assistance session at the physical location using an enterprise user device provided to the client, wherein the enterprise user device is configured to communicate with a second enterprise user device of the selected resource.

8. The computing platform of claim 1, wherein configuring the virtual assistance session comprises:
 configuring a live customer assistance session at the physical location using a client device of the client, wherein the client device is configured to communicate with an enterprise user device of the selected resource upon selection of a secure access link provided to the client device.

9. The computing platform of claim 1, wherein configuring the virtual assistance session comprises:
 configuring a live customer assistance session at a location of the client, different than the physical location, by establishing a secure session between a mobile banking application running on a client device of the client and an enterprise user device of the selected resource.

10. The computing platform of claim 1, wherein the one or more available resources comprise resources located at one of more of: a different physical location of the enterprise or a remote work location.

11. The computing platform of claim 1, wherein the memory stores additional computer-readable instructions that, when executed by the at least one processor, cause the computing platform to:
 maintain an accuracy threshold of the resource allocation model;
 compare an accuracy of the resource allocation model to the accuracy threshold; and
 based on identifying that the accuracy is greater than the accuracy threshold, pause updates to the resource allocation model.

12. The computing platform of claim 11, wherein the memory stores additional computer-readable instructions that, when executed by the at least one processor, cause the computing platform to:
 identify, while updates to the resource allocation model are paused, that the accuracy has dropped below the accuracy threshold; and
 based on detecting that the accuracy has dropped below the accuracy threshold, resume the updates to the resource allocation model.

13. A method comprising:
 at a computing platform comprising at least one processor, a communication interface, and memory:
 training a resource allocation model, wherein training the resource allocation model comprises:
  establishing stored correlations between resources and using historical information associated with historical client requests, wherein the historical information includes one or more of: employee skills information, employee availability information, language preference information, geographic information, client feedback information, employee attendance schedules, holiday information, time information, date information, location popularity information, and client/employee relationship information,
  configuring a hierarchical system, within the resource allocation model, indicating a priority in which resources from different markets are selected,
  establishing a resource ranking based on satisfaction ratings, and
  training one or more of: a decision tree model, bagging model, boosting model, random forest model, neural network, linear regression model, artificial neural network, support vector machine, classification model, clustering model, anomaly detection model, feature engineering model, or feature learning model, wherein training the resource allocation model configures the resource allocation model to identify, based on the stored correlations, the hierarchical system, and the resource ranking, one or more available resources for processing a given client request;

receiving a client request, wherein:
the client request indicates an intent of a corresponding client,
the client request indicates that in person assistance at a physical location of an enterprise corresponding to the computing platform is requested, and
all physical resources at the physical location are currently unavailable to assist in processing the client request;

inputting, into the resource allocation model, the intent to identify one or more available resources for processing the client request, wherein the one or more available resources are located at locations different than the physical location, and wherein identifying the one or more available resources comprises:
identifying a first subset of resources without a current scheduling conflict,
identifying, within the first subset of resources, a second subset of resources comprising a requisite skill level to process the client request, and
identifying, within the second subset of resources, the one or more available resources by identifying resources, of the second subset of resources, comprising an available status;

sending, to user devices of the one or more available resources, requests to process the client request;

receiving, within a predetermined period of time, a response from at least one of the one or more available resources, indicating acceptance of the request to process the client request;

selecting one of the one or more available resources;

configuring a virtual assistance session between the client and the selected resource to facilitate processing of the client request; and dynamically updating, based on the client request, the selected resource, and user feedback, the resource allocation model to continuously improve accuracy of the resource allocation model.

14. The method of claim 13, wherein receiving the client request comprises receiving, from an enterprise user device located within the physical location, the client request.

15. The method of claim 14, wherein the client request is input via a display of the enterprise user device by an employee of the enterprise upon arrival of the client at the physical location.

16. The method of claim 13, wherein receiving the client request comprises receiving, from a client device, the client request, and wherein the client request is input via a display of the client device by the client at a location different than the physical location.

17. The method of claim 13, wherein receiving the response from at least one of the one or more available resources comprises receiving responses from at least two available resources.

18. The method of claim 17, wherein selecting the one of the one or more available resources comprises:
inputting identities of the at least two available resources and the client request into the resource allocation model to produce a resource allocation score for each of the at least two available resources;
ranking, based on the resource allocation scores, the at least two available resources; and
selecting a highest ranked resource of the at least two available resources.

19. The method of claim 13, wherein configuring the virtual assistance session comprises:
configuring a live customer assistance session at the physical location using an enterprise user device provided to the client, wherein the enterprise user device is configured to communicate with a user device of the selected resource.

20. One or more non-transitory computer-readable media storing instructions that, when executed by a computing platform comprising at least one processor, a communication interface, and memory, cause the computing platform to:
train a resource allocation model, wherein training the resource allocation model comprises:
establishing stored correlations between resources and using historical information associated with historical client requests, wherein the historical information includes one or more of: employee skills information, employee availability information, language preference information, geographic information, client feedback information, employee attendance schedules, holiday information, time information, date information, location popularity information, and client/employee relationship information,
configuring a hierarchical system, within the resource allocation model, indicating a priority in which resources from different markets are selected,
establishing a resource ranking based on satisfaction ratings, and
training one or more of: a decision tree model, bagging model, boosting model, random forest model, neural network, linear regression model, artificial neural network, support vector machine, classification model, clustering model, anomaly detection model, feature engineering model, or feature learning model, wherein training the resource allocation model configures the resource allocation model to identify, based on the stored correlations, the hierarchical system, and the resource ranking, one or more available resources for processing a given client request;

receive a client request, wherein:
the client request indicates an intent of a corresponding client,
the client request indicates that in person assistance at a physical location of an enterprise corresponding to the computing platform is requested, and
all physical resources at the physical location are currently unavailable to assist in processing the client request;

input, into the resource allocation model, the intent to identify one or more available resources for processing the client request, wherein the one or more available resources are located at locations different than the physical location, and wherein identifying the one or more available resources comprises:
identifying a first subset of resources without a current scheduling conflict,
identifying, within the first subset of resources, a second subset of resources comprising a requisite skill level to process the client request, and
identifying, within the second subset of resources, the one or more available resources by identifying resources, of the second subset of resources, comprising an available status;

send, to user devices of the one or more available resources, requests to process the client request;

receive, within a predetermined period of time, a response from at least one of the one or more available resources, indicating acceptance of the request to process the client request;
select one of the one or more available resources;
configure a virtual assistance session between the client and the selected resource to facilitate processing of the client request; and
dynamically update, based on the client request, the selected resource, and user feedback, the resource allocation model to continuously improve accuracy of the resource allocation model.

* * * * *